Feb. 2, 1965   J. E. BACLAWSKI   3,168,663
DYNAMOELECTRIC MACHINE
Filed Dec. 17, 1962
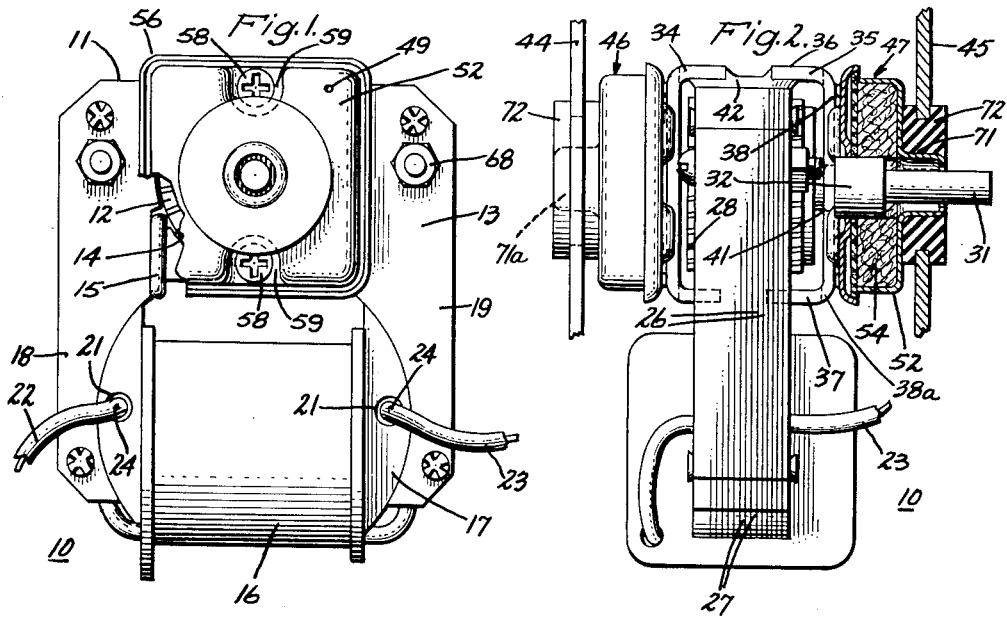
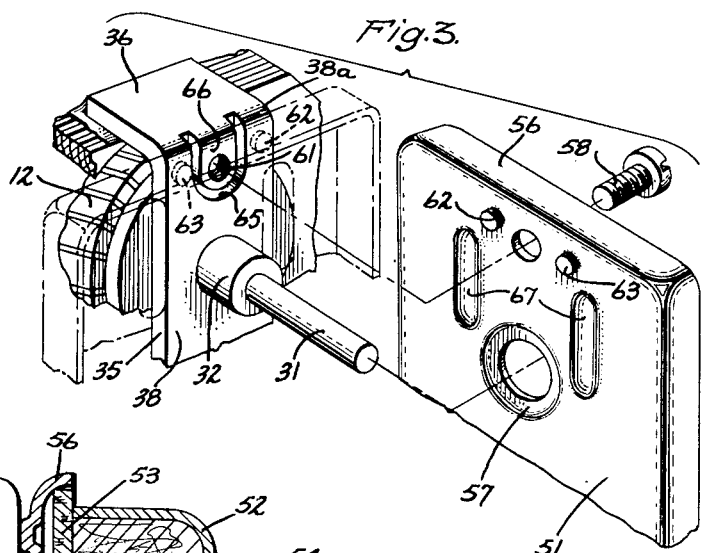
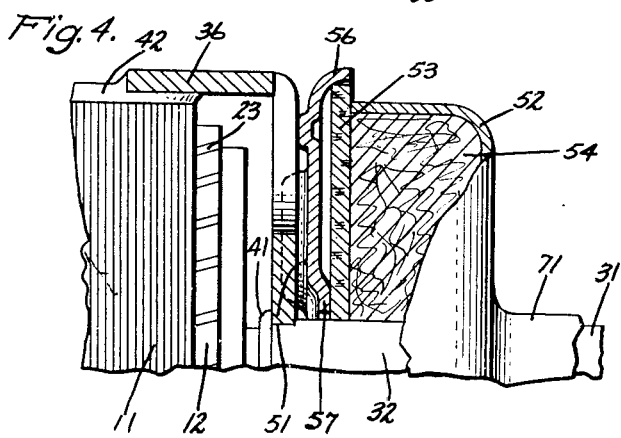
INVENTOR.
Joseph E. Baclawski,
by John M. Stoudt
Attorney.

United States Patent Office 3,168,663
Patented Feb. 2, 1965

3,168,663
DYNAMOELECTRIC MACHINE
Joseph E. Baclawski, Fort Wayne, Ind., assignor to General Electric Company, a corporation of New York
Filed Dec. 17, 1962, Ser. No. 245,218
6 Claims. (Cl. 310—90)

This invention relates generally to dynamoelectric machines and more particularly to an improved end frame and lubrication arrangement for use in small electric motors employing sleeve bearings to support the rotor.

It is a general object to provide an improved end frame and lubrication arrangement for small electric motors, and it is a more specific object to provide the improved arrangement while maintaining economy in the fabrication and assembly of the motor parts.

It is another object of the present invention to provide an improved lubrication assembly in which its attachment to the motor frame carrying a sleeve type bearing is low in cost, yet will not produce an adverse affect on the bearing securement.

It is still another object of this invention to provide an improved end shield and lubrication arrangement which is capable of satisfactorily mounting the motor onto a supporting structure without transmitting mounting stresses to the motor bearings.

In carrying out the objects in one form, I provide a small electric motor including a stator, a rotor secured to a shaft and a pair of end frames or generally U-shaped brackets each mounting a porous sleeve type bearing for rotatably supporting the rotor shaft on either side of the rotor. For feeding lubricant to the bearing journal surfaces, I furnish a lubrication reservoir assembly having a lubricant impregnated pad surrounding the outer surface of the bearing and in contact therewith.

The assembly also includes a substantially imperforate casing enclosing the pad, except for the area of contact between the pad and the bearing, which is preferably mounted to the bracket by a pair of diametrically arranged screws extending through the casing and into threaded holes provided in the end frames. The wall of the assembly casing disposed next to the bracket is formed with protuberances for engagement with the bracket on either side of the threaded holes preferably adjacent a curved portion of the bracket, to space the assembly from the bracket. In addition, a groove is cut into the bracket, which isolates the threaded hole from the bearing as well as the protuberances to form a tongue carrying the screw receiving hole. Among other advantages, this arrangement not only is inexpensive to fabricate and install but also prevents the transmission of mounting stress to the bearing. Consequently, by virtue of the foregoing construction, it is possible to provide a low cost mounting for the motor in which a hub is extruded into the casing wall disposed away from the motor and to assemble a resilient mounting ring thereon for supporting the motor without adversely affecting the manner in which the bearing is supported by the brackets.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawing in which:

FIG. 1 is an elevational view, partially broken away, of a small electric motor which embodies my invention in one form thereof;

FIG. 2 is a side view, partially in section, of the motor of FIG. 1 to show detail;

FIG. 3 is a partial exploded and enlarged fragmentary view of one end of the motor to illustrate details of the preferred manner in which the lubricant reservoir-motor mounting assembly is connected to the motor frame; and FIG. 4 is an enlarged sectional view taken along the line 4—4 in FIG. 1 revealing additional details of the lubricant reservoir-motor mounting assembly.

Referring now to the drawing, for purposes of illustration I have shown an electric motor 10 of the shaded pole type embodying the preferred form of my invention. Motor 10 conventionally includes a stator 11 and a rotor 12, with the rotor being positioned between a pair of oppositely disposed pole faces provided on the main yoke section 13 of stator 11. One of the pole faces is indicated by numeral 14. The rotor is activated during operation by means of magnetic flux passing between the pole faces in the usual way. Suitable shading coils are provided at the trailing ends of the stator pole faces to provide starting torque and to aid in producing running torque. For example, the shading coils for pole face 14 may comprise copper rings which are indicated at 15 and it will be understood that similar coils may be mounted diametrically opposite on the other pole face.

The magnetic flux for exciting rotor 12 is provided by an electrical winding or coil 16 which is suitably mounted on a core section 17 of the stator. As best seen in FIG. 1, core 17 is positioned between and in tight engagement with depending leg portions 18 and 19 of the stator which serve to complete the flux path between the pole faces and core 17.

A pair of identical slots 21 are provided at the opposite ends of core 17 to accommodate lead-in wires 22, 23 which are suitably connected at one end to the coil extremities for energization of the winding. The walls of these slots may be covered by a bonding material 24 to secure the leads in place for stress relief purposes.

As is best seen in FIG. 2, both the core and main yoke sections are respectively formed on a plurality of stacked laminations 26, 27 of magnetic material. In the case of the rotor, a squirrel-cage winding 28 of conducting material may be provided in suitable slots formed therein.

In order to support the rotor 12 for relative rotation with respect to the stator, it will be noted from FIG. 2 that rotor 12 is mounted on an output shaft 31 which in turn is journaled at opposite sides of the rotor by identical sleeve type bearings 32. In the illustrated form, each bearing is composed of relatively porous sintered material and has the end disposed toward the rotor firmly secured to suitable motor end frame members or brackets 34, 35, preferably formed of aluminum, and clearly seen in FIG. 2. The brackets are U-shaped in configuration, with legs 36, 37 of the U being attached to the stator and with the bight or central wall section 38, which joins the legs together at curved portions 38a, supporting the associated bearing 32. In particular, one end of each bearing extends through a suitable opening provided at the center of each bracket and is staked thereto, as indicated at 41. This staking is done under a considerable presure and forms a permanent mount of the bearing on its respective end bracket. The end brackets may be attached to the stator by any suitable means, such as cement 42 or the like, such that bearings 32 are in accurate axial alignment to journal the shaft with a minimum of interference therewith.

For furnishing lubricant to the journal surfaces of the bearings, an improved yet low cost removable lubricant reservoir assembly is provided for each bearing which may also conveniently form the means for mounting the motor onto stationary supports, referenced 44, 45 in FIG. 2, without adversely affecting either the firm securement of bearing 32 to the respective end frames 34 and 35 or the alignment between bearing 32 and shaft 31 achieved during prior steps of assembly.

As illustrated, the reservoir assemblies denoted generally by numerals 46 and 47, each comprise a substantially imperforate casing provided by a back plate 51 and a cooperating cup-shaped cover 52, a seal or gasket 53 arranged therebetween, and lubricant retaining means 54 in the form of a pad which is enclosed within cover 52 for its protection and for the prevention of lubricant evaporation. This pad, impregnated with suitable lubricant oil, is disposed around the outer peripheral surface of the bearing 32 to provide a region of contact therewith. During operation, the lubricant in the pad slowly seeps from the pad through the region of contact into the bearing and then through the bearing body to the journal surface to lubricate it. It will be understood that this seepage preferably occurs at a very slow rate; e.g., in the neighborhood of one tenth of a centimeter per thousand hours of operation.

Referring now in more detail to the illustrated components of the reservoir assembly, plate 51 is formed from sheet material into a flat wall section, which terminates in a flange 56, and has a boss 57 surrounding a centrally located bearing accommodating opening or hole. Seal 53, composed of suitable resilient sealing material such as cork, has a central hole having its rim in engaging relation with the bearing. The gasket fits within the confines of flange 56, and is firmly engaged adjacent the flange by the inner edge of cover 52 of its entire perimeter. A breather opening 49 is provided in cover 52 to allow air to enter and leave the interior of the reservoir, keeping the air pressure within the reservoir the same as that of the surrounding environment. These parts are held together in assembled relation by a pair of screws 58 which urge the gasket into firm and sealing engagement with both the wall section and boss 57 of plate 43 to provide a good seal and permit disassembly to re-supply lubricant to pad 54 from time to time as required. These screws attach the assembled parts onto the respective end frames 34 and 35 in a manner now to be described.

In the illustrated form, cover 52 is provided with a pair of diametrically arranged depressions 59 (FIG. 1) for accommodating the heads of screws 58, which have their threaded ends projecting through cover 52, seal 53, wall section of plate 51, and into threaded holes 61 provided in the wall section of the end frame. In accordance with the present invention, as best seen in FIG. 3, at each place of securement, plate 51 is furnished with spaced apart relatively small embossments or protuberances 62, 63 arranged to abut firmly against the motor end frame, at least one on either side of hole 61, in the vicinity of curved portion 38a. These protuberances may take any suitable form and are shown as being of rounded configuration merely for purposes of disclosure. A generally U-shaped groove or channel 65 is cut through wall section 38 of the end frame member, interposed between hole 61 and the location on the frame where the spaced apart projections 62, 63 rest, in the manner clearly seen in FIG. 3. The ends of the U-shape groove extend away from the bearing and preferably terminate at curved portion 38a of the frame member to form a depending section or tongue 66. Projections 62, 63 serve to space plate 51 slightly away from the wall section 38 while the tongue is capable of slight axial movement relative to the remainder of wall section 38.

With this arrangement, when screws 58 draw the component parts of assembly 47 tightly together in a finally assembled relation as they are being installed onto the end frame, tongue 66, along with groove 65, isolates the stresses or forces resulting from the securement of screws 58 in holes 61 and the weight carried thereby, and effectively prevents the transmission of these stresses to the bearing, thereby avoiding distortion of a major part of end frame wall section 38 and the resulting adverse affect on bearing-shaft alignment and on the secureness of the staked bearing support. Plate 51, if desired, may also be formed with outwardly extending spaced apart vertical ribs 67 serving to locate the plate on the end frame and to augment the strength of the plate wall section.

As will now be explained, although conventional bolts 68 (FIG. 1) may be employed to mount the motor to stationary supports 44, 45 in view of the afore-described arrangement, it is possible to use assemblies 46, 47 for mounting the motor in an entirely satisfactory way in spite of the removable and inexpensive nature of these assemblies. For example, cover 52 may be conveniently formed with an extruded central hub 71, or hub 71a in the case of the left hand assembly 46 in FIG. 2. The only difference between hubs 71 and 71a is that hub 71 includes an opening to allow the output end of shaft 31 to extend beyond the motor whereas hub 71a is entirely solid. It is intended that hub 71, although open to allow passage therethrough of shaft 31, is so extended that oil seeping out of the outboard end of the associated bearing does not escape from the motor, but merely falls onto the shaft. Hubs 71 and 71a serve as the main mounting members for the motor, and as such, accommodate resilient mounting rings 72 which may be attached to supports 44, 45 to support or suspend the motor therebetween. Thus, bolts 68 and the holes which receive them in the stator may be eliminated to provide additional magnetic material. In view of the mounting stress isolation arrangement previously described, hubs 71 and 71a need not function to support the bearings at their outboard ends, permitting the use of low cost untoleranced pieces, if so desired, without a corresponding unnecessary sacrifice in rigidity or quality in the bearing support.

Considering all of the above, it will be seen that while I have provided a low cost end frame and lubrication arrangement for use in small electric motors employing sleeve type bearings, I have done so without sacrifice in the quality of bearing support obtained, and in fact, have actually provided an improvement in the isolating of stresses from the bearing while using a removable type reservoir in the overall construction. In addition, I have provided an arrangement which is simple to manufacture and easily installed.

It should be apparent to those skilled in the art, that while I have shown and described what at present is considered to be the preferred embodiment of my invention in accordance with the patent statutes, changes may be made in the disclosed method without actually departing from the true spirit and scope of this invention, and I therefore intend to cover in the following claims all such equivalent variations as fall within the invention.

What I claim as new and desire to secure by Letters Patent of the United States is:

1. A dynamoelectric machine comprising a stator, a shaft, a rotor fixedly attached to said shaft, at least one bearing journaling said shaft, frame means mounting each bearing on said stator, and a lubricant reservoir assembly for supplying lubricant to the journal surface of each bearing, said assembly including a casing, lubricant impregnated material disposed within said casing adjacent said bearing for feeding lubricant to the journal surface thereof, means attaching said assembly to said frame means, the wall of said casing adjacent said frame means being formed with spaced apart protuberances in contact with said frame means on either side of said attaching means, and a groove formed in said frame means adjacent the attaching means, with the groove being disposed between said bearing and said attaching means and between said protuberances and said attaching means.

2. A dynamoelectric machine comprising a stator, a shaft, a rotor fixedly attached to said shaft, at least one bearing journaling said shaft, frame means mounting each bearing on said stator, and a lubricant reservoir assembly for supplying lubricant to the journal surface of each bearing, said assembly including a lubricant impregnated pad disposed adjacent said bearing for feeding lubricant thereto and a substantially imperforate casing enclosing said pad except for the region of contact between said bearing and material, means attaching said assembly to said frame means, the wall of said casing adjacent said frame means being formed with spaced apart protuberances in contact with said frame means on either side of said attaching means to space a major part of the casing away from said frame means, and a generally U-shaped groove formed in said frame means adjacent the attaching means, with a part of the groove disposed between said bearing and said attaching means and between said protuberances and said attaching means.

3. A dynamoelectric machine comprising a stator, a shaft, a rotor fixedly attached to said shaft, bearing journaling said shaft, frame means including a generally U-shaped bracket having a pair of leg sections and a wall section joined together by a curved portion, mounting each bearing on said stator, and a lubricant reservoir assembly for supplying lubricant to the journal surface of each bearing, said assembly including a casing, lubricant impregnated material disposed within said casing adjacent said bearing for feeding lubricant to the journal surface thereof, means attaching each assembly to a bracket, the wall of said casing adjacent the associated bracket being formed with spaced apart protuberances in contact with said frame means on either side of said attaching means to space the remainder of the casing away from the bracket, and a groove formed in said brackets adjacent each of said attaching means, with the groove being positioned between said bearing and said attaching means and between said protuberances and said attaching means, said grooves each having their ends terminating at said curved portions of said brackets.

4. An electric motor comprising a stator, a shaft, a rotor fixedly secured to said shaft, frame means disposed respectively on the opposite sides of said stator, rotatably supporting said shaft relative to said stator including a generally U-shaped end bracket having spaced apart leg sections and a wall section joined by a curved portion, means connecting said leg sections to said stator, a porous bearing for journaling said shaft mounted to each bracket with one end secured to said bracket wall section and with the other end extending away from the rotor, a lubricant reservoir assembly attached to each bracket radially outwardly of the bearing, each assembly comprising lubricant absorbent material disposed around and in contact with at least a portion of the perihperal surface of said porous bearing, and a casing substantially surrounding said material except for the region of contact between said bearing and said material, means attaching said casing to said bracket wall section, the wall of said casing disposed next to said wall section being formed with at least one protrusion for engagement therewith on either side of the attaching means adjacent said curved portion to space the remainder of the casing wall away from said wall section, a generally U-shaped groove arranged between said attaching means and both the bearing and said protrusions for isolating stresses from said bearing, said casing including a portion extending outwardly of the assembly to form a hub for supporting a resilient ring to mount the motor.

5. In an electric motor having a stator, a shaft, a rotor fixedly secured to said shaft and frame means supporting at least one bearing for rotatably supporting said shaft relative to said stator, a lubricant reservoir assembly for supplying lubricant to the bearing comprising a plate member having an opening for accommodating the bearing, and formed with spaced apart protuberances for engagement with the frame means at predetermined locations to space the remaining portion of the plate member therefrom, a generally imperforate cup-shaped cover having its edge disposed adjacent the outer portion of said plate, means sealing the plate and cover to form a substantially imperforate casing, lubricant retaining material within said casing and adapted to be arranged around the bearing, said cover formed with an extruded hub to accommodate a resilient mounting ring, and screw means for holding the assembly together and for attaching it to the frame means.

6. In an electric motor having a stator, a shaft, a rotor fixedly secured to said shaft and a pair of end frame members each supporting a sleeve type bearing for rotatably supporting said shaft relative to said stator, a lubricant reservoir assembly for supplying lubricant to each bearing comprising a plate member formed with a flange at its outer edge with a generally central hole for accommodating the bearing, with a surrounding boss, and with spaced apart protuberances extending away from said boss for engagement with the associated end frame at predetermined locations to space the remaining portion of the plate member therefrom, a sealing member disposed within the confines of said flange adjacent thereto formed with a central hole for accommodating the bearing and having a portion of one face adjacent said hole in sealing contact with said boss, a generally imperforate cup-shaped cover having its edge in firm engagement with the other face of the sealing member, and lubricant retaining material arranged within said cover next to said sealing member and adapted to be extended around the bearing, and screw means for holding the assembly together and for attaching it to the frame means.

No references cited.